United States Patent [19]
Charles

[11] 4,201,194
[45] May 6, 1980

[54] SOLAR HEAT COLLECTOR WITH CHANNELED PANEL

[76] Inventor: Paul A. S. Charles, c/o Heliodyne, Inc. 4571 Linview Dr., Rockford, Ill. 61109

[21] Appl. No.: 867,467

[22] Filed: Jan. 6, 1978

[51] Int. Cl.² .............................................. F24J 3/02
[52] U.S. Cl. .................................................. 126/449
[58] Field of Search ............... 126/270, 271; 237/1 A; 165/170, 171, 173; 350/293

[56] References Cited
U.S. PATENT DOCUMENTS

| | | | |
|---|---|---|---|
| 3,125,091 | 3/1964 | Sleeper, Jr. | 126/271 |
| 3,205,937 | 9/1965 | Shyffer | 126/270 |
| 3,679,531 | 7/1972 | Wienand et al. | 165/171 |
| 4,003,366 | 1/1977 | Lightfoot | 126/271 |
| 4,062,346 | 12/1977 | Rapp, Jr. et al. | 126/270 |
| 4,114,592 | 9/1978 | Winston | 126/270 |
| 4,141,339 | 2/1979 | Weinstein | 126/270 |

FOREIGN PATENT DOCUMENTS 2546619 4/1976 Fed. Rep. of Germany ........... 126/271

*Primary Examiner*—James C. Yeung
*Attorney, Agent, or Firm*—Leydig, Voit, Osann, Mayer & Holt, Ltd.

[57] ABSTRACT

A panel is secured to the roof of a building in spaced relation with the roof so that a flow space for air is defined between the panel and the roof. The upper surface of the panel is defined by a series of channels whose side walls are formed with a concave-convex shape to cause solar radiation to reflect back and forth between opposing side walls a substantial number of times and thereby cause more energy to be absorbed by the panel for the purpose of heating the air in the flow space.

7 Claims, 5 Drawing Figures

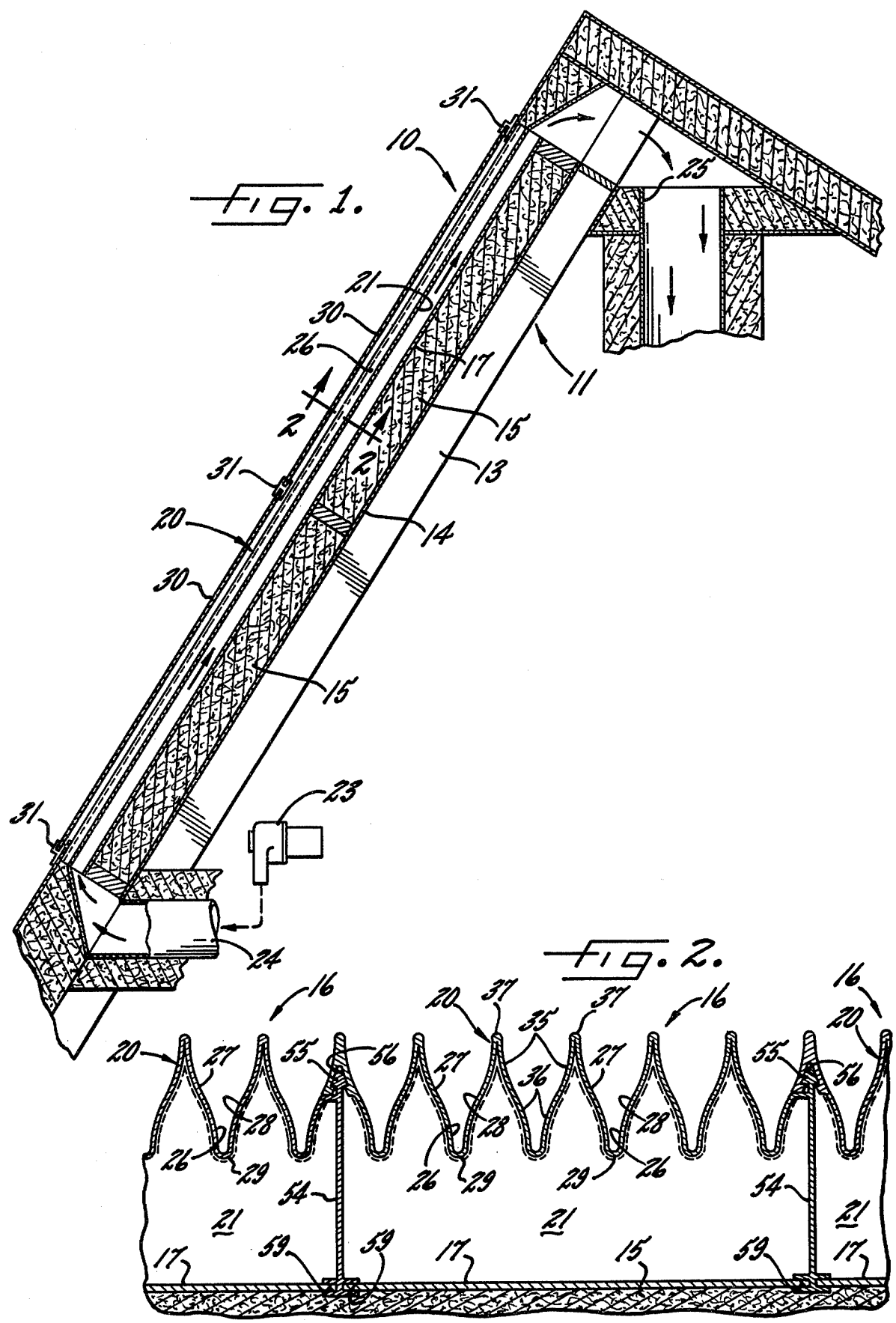

SOLAR HEAT COLLECTOR WITH CHANNELED PANEL

BACKGROUND OF THE INVENTION

This invention relates to a solar heat collector of the type in which a panel is attached, for example, to the roof of a building in spaced relation from the roof so that a flow space for air or other fluid is defined between the panel and the roof. When solar rays strike the panel, a certain amount of the solar energy is absorbed as heat and the remainder of the energy is reflected from the panel. The heat which is absorbed raises the temperature of the air in the flow space and such air may be used to heat the building.

The invention has more particular reference to a solar panel whose upper side is defined by a series of substantially V-shaped channels. Radiation at certain incident angles reflects back and forth between the two opposing side walls of each channel before being reflected from the channel. As a result, more energy is absorbed and less is reflected so as to increase the effectiveness of the panel.

SUMMARY OF THE INVENTION

The general aim of the present invention is to provide a solar heat collector having a new and improved panel in which the side walls of the channels are uniquely shaped to cause the radiation to reflect back and fourth between the opposing side walls a substantially greater number of times than is the case with the channels of prior panels, the present panel thereby absorbing more energy and being capable of more efficient use.

A more detailed object is to achieve the foregoing by forming the outer or upper portion of each side wall of each channel with a concave curvature and by forming the inner or lower portion of each side wall with a convex curvature. As a result, solar rays at different angles of incidence tend to reflect back and forth in the channel a greater number of times before being reflected from the channel.

The invention also resides in the provision of fins on the lower side of the channels to increase the efficiency of heat transfer to the flow space, and in the unique formation of the panels as interlocking modules.

These and other objects and advantages of the invention will become more apparent from the following detailed description when taken in conjunction with the accompanying drawings.

BRIEF DESCRIPTION OF THE DRAWINGS

FIG. 1 is a fragmentary cross-section taken through the roof structure of an exemplary building equipped with new and improved solar heat collecting panels incorporating the unique features of the present invention.

FIG. 2 is an enlarged fragmentary cross-section taken substantially along the line 2—2 of FIG. 1.

DETAILED DESCRIPTION OF THE PREFERRED EMBODIMENTS

Figure 3:
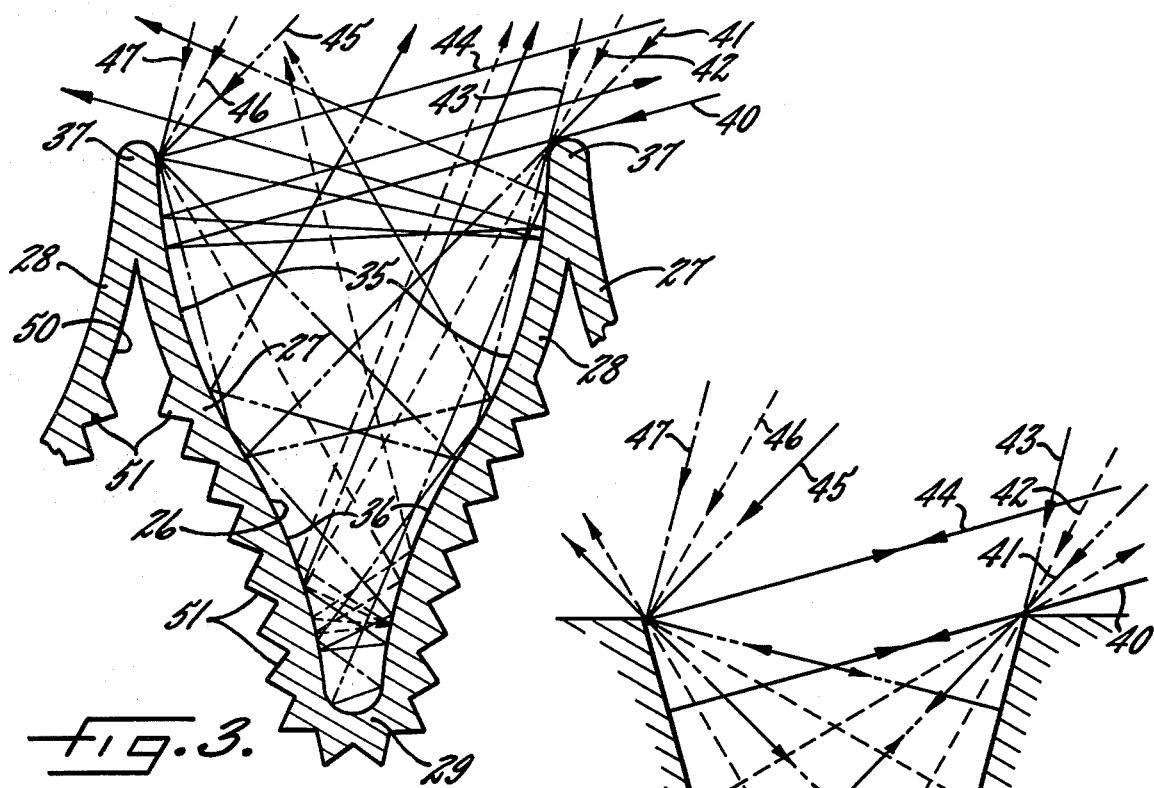
FIG. 3 is an enlarged view of one of the channels of the panel and schematically shows the manner in which radiation is reflected by the side walls of the channel.

For purposes of illustration, the solar heat collector 10 of the present invention is shown as installed on the top wall or roof 11 of a building such as a house. Typically, the roof includes pitched rafters 13 covered by plyboard 14 and insulation 15.

The collector 10 includes several identical modules 16 (FIG. 2) disposed in side-by-side relation on top of the insulation 15. Each module comprises an aluminum bottom plate 17 and a top panel 20 which also is preferably made of aluminum or other heat conductive material capable of retaining its shape under a wide range of ambient temperature conditions. The upper surface of each panel is formed with a black anodized finish.

As shown in FIG. 2, the top panel 20 of each module 16 is spaced upwardly from the bottom plate 17 thereof so that a flow space 21 is defined between the panel and the plate. Air is circulated through the flow space and is heated by radiant energy which is absorbed by and conducted through the top panel. To circulate the air, the outlet of a centrifugal blower 23 (FIG. 1) is connected to a duct 24 which communicates with the flow space 21 of each module adjacent the lower end thereof. The blower forces air upwardly through the flow spaces and than into a duct 25 which communicates with the forced air distribution system of the house.

Rather than being flat, the upper surface of each top panel 20 is of serpentine cross-section and is defined by a series of side-by-side channels 26 which extend parallel to the rafters 13. Each channel opens upwardly, is substantially V-shaped in cross-section and is defined by a pair of opposed side walls 27 and 28 and a bottom wall 29. The channels 26 are covered by panes 30 (FIG. 1) of glass which overlie the panels 20 and which are held in place by suitable fasteners 31.

By virtue of the channels 26, radiation does not simply strike the panel 20 and reflect upwardly. Instead, some of the solar rays, at certain angles of incidence, strike one side wall 27 of each channel, then reflect to the other side wall 28 and may reflect back to the first side wall before being reflected upwardly out of the channel. As a result of the multiple reflections, more of the energy is absorbed by the panel 20 as heat and less energy is reflected back into space than is the case where the panel defines a flat surface.

In accordance with the present invention, the side walls 27 and 28 of each channel 26 are formed with a unique concave-convex shape to cause the radiation to reflect back and forth between the side walls a greater number of times than occurs when the side walls are simply planar. As a result, more energy is absorbed at both high and low angles of incidence and thus the efficiency of energy collection is increased.

More specifically, the upper end portion of each side wall 27, 28 of each channel 26 is formed with a smoothly curved concave shape as indicated at 35 in FIG. 3. About midway along its height, each side wall curves reversely and thus is formed with a convex curvature as indicated at 36. The upper side of the bottom wall 29 which connects the two opposing side walls 27, 28 is formed with an upwardly concave radius as shown in FIG. 3 and the adjacent side walls of adjacent channels 26 are joined by a peak 37 whose upper end is formed with an upwardly convex radius.

Figure 4:
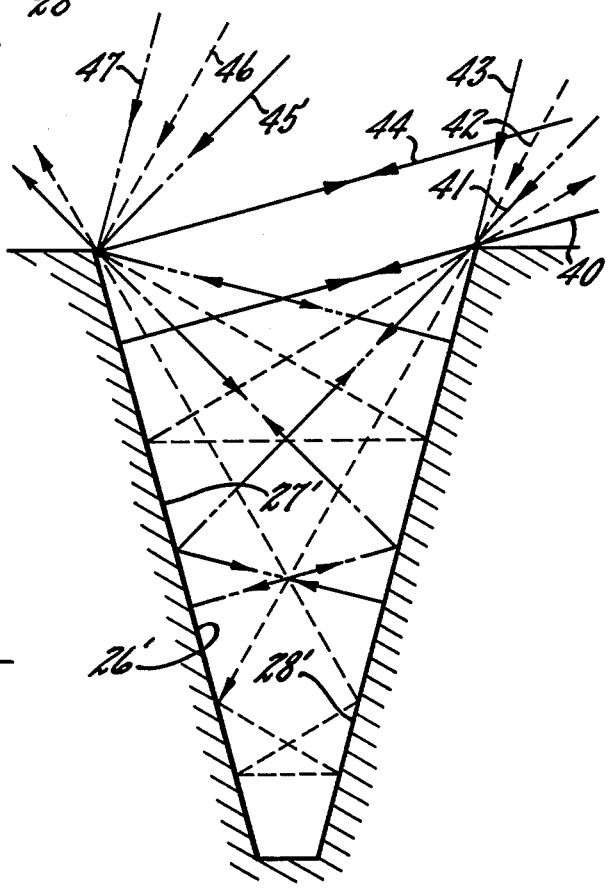
FIG. 4 is a view similar to FIG. 3 but shows the channel of a typical prior art solar collecting panel.

To help explain the significance of the concave-convex shape of the side walls 27, 28 of the channels 26, reference is made to FIG. 4 which shows a conventional channel 26' defined by planar side walls 27' and 28'. The channels 26 and 26' each have the same depth, each have the same width at their upper ends and each have the same width at their lower ends. Each flat wall 27', 28' of the channel 26' is inclined at an angle of 15 degrees relative to the vertical.

The lines indicated by 40, 41, 42 and 43 in FIGS. 3 and 4 represent solar rays at angles of 15, 45, 60 and 75 degrees, respectively, and just capable of passing into a given channel 26, 26' adjacent the upper end of the side wall 28, 28' of the channel. The lines indicated by 44, 45, 46 and 47 represent rays which also are disposed at angles of 15, 45, 60 and 75 degrees, respectively, and which first strike the extreme upper end of the opposing side wall 27, 27' of the channel 26, 26'.

With reference to FIG. 4, the ray 40 strikes the side wall 27' at an angle of ninety degrees and reflects reversely and directly out of the channel 26' along the same line as the line of entry. In contrast, the ray 40 in FIG. 3 strikes the concave portion 35 of the side wall 27 and then reflects to the concave portion 35 of the side wall 28 before being reflected out of the channel 26. Because of the concave portion 35, the ray 40 strikes the side wall 27 at an angle other than 90 degrees and thus reflect back across the channel 26 to the wall 28 rather than reflecting directly out of the channel off of the wall 27.

For the most part, the rays 41 to 47 also reflect more times in the channel 26 than in the channel 26'. This is demonstrated by a comparison of the reflection patterns shown in FIG. 3 with those shown in FIG. 4 and also by the following table:

| RAY | NUMBER OF REFLECTIONS | |
| --- | --- | --- |
| | CHANNEL 26 | CHANNEL 26' |
| RAY 40 (15°) | 2 | 1 |
| RAY 41 (45°) | 2 | 3 |
| RAY 42 (60°) | 4 | 4 |
| RAY 43 (75°) | 5 | 1 |
| RAY 44 (15°) | 3 | 1 |
| RAY 45 (45°) | 3 | 3 |
| RAY 46 (60°) | 5 | 3 |
| RAY 47 (75°) | 6 | 4 |

Thus, it is apparent that the concave-convex shape of the side walls 27 and 28 of the channel 26 results in more reflections within the channel so as to increase the energy which is absorbed by the panel 20. Accordingly, a panel 20 of a given area is more efficient than a panel of the same area and having channels 26' with planar side walls 27' and 28'.

As shown in FIG. 3, the lower side of the panel 20 also is of serpentine cross-section and is defined by downwardly opening and substantially V-shaped channels 50 whose side walls each have a convexly curved upper end portion and a concavely curved lower end portion. To increase the efficiency of the heat transfer from the panel 20 to the flow space 17, V-shaped fins 51 are formed integrally with and extend along the side walls of the channels 50. The fins are spaced vertically from one another and increase the effective heat transfer area of the lower side of the panel 20.

Advantageously, each module 16 is adapted to be easily interconnected with an adjacent module. For this purpose, one side edge of each panel 20 is formed with a depending wall 54 (FIG. 2) whose upper end is defined by an upwardly projecting male connector which herein is in the form of a rib 55. The opposite side edge of the panel includes a complementary female connector in the form of a downwardly opening groove 56. Thus, the modules 16 may be interconnected with one another simply by fitting the rib 55 of one panel into the groove 56 of the adjacent module. To hold the bottom plate 17 of the module, the lower end portion of each wall 54 is formed with vertically spaced lips which define grooves 59 for receiving the adjacent side edge portions of adjacent bottom plates.

Figure 5:
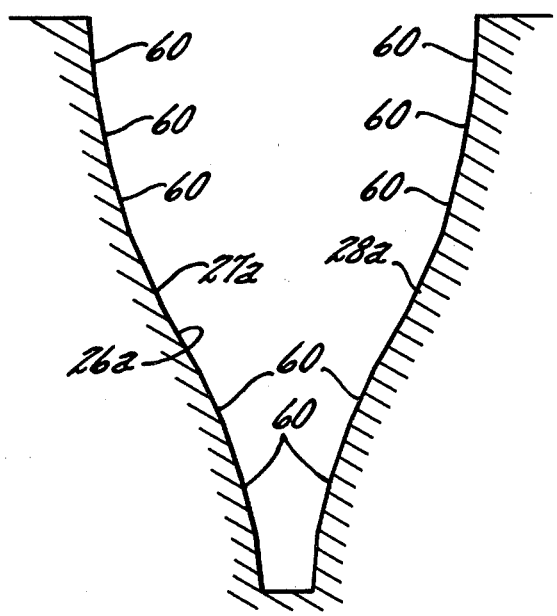
FIG. 5 also is a view similar to FIG. 3 but shows a modified channel incorporating the features of the invention.

The side walls 27 and 28 of the channel 26 need not necessarily be smoothly curved in order to incorporate the concave-convex shape into the channel. As shown in the modified embodiment of FIG. 5, each of the side walls 27a and 28a is formed by a series of short, planar sections 60 which are joined to one another. Each section 60 is angled slightly with respect to its adjacent sections so as to cause the upper portion of the channel 26a to be concave and to cause the lower portion of the channel to be convex. Radiation reflects back and forth between the side walls of the channel 26a in substantially the same manner as in the channel 26.

I claim:

1. A solar heat collector comprising a panel adapted for mounting exteriorly of the wall of a building in spaced relation with the wall whereby a flow space is defined between the panel and the wall, said panel being made of a material which is capable of retaining its shape under a wide range of ambient temperature conditions, said panel being of serpentine cross-section and having an outer side defined by a series of outwardly opening and substantially V-shaped channels, each side wall of each channel being of a permanent shape and of low reflectivity and having a concavely curved outer end portion and a convexly curved inner end portion, the outer end portion of the side wall of each channel merging gradually with the inner end portion thereof.

2. A solar heat collector comprising a panel adapted for mounting above the roof of a building in spaced relation with the roof whereby a flow space is defined between the roof and the lower side of the panel, said panel being made of a material which is capable of retaining its shape under a wide range of ambient temperature conditions, said panel being of serpentine cross-section and having an upper side defined by a series of upwardly opening and substantially V-shaped channels disposed in side-by-side relation and all extending in the same direction, each side wall of each channel being of a permanent shape and of low reflectivity and having a concavely curved upper end portion and having a convexly curved lower end portion, the upper end portion of the side wall of each channel merging gradually with the lower end portion thereof.

3. A solar heat collector as defined in claim 2 in which the upper and lower end portions of the side wall of each channel are defined by surfaces which continuously curve.

4. A solar heat collector as defined in claim 2 in which the upper and lower portions of the side wall of each channel are defined by a plurality of planar surfaces which are joined to one another.

5. A solar heat collector as defined in claim 2 in which the lower side of said panel is defined by a series of downwardly opening and substantially V-shaped channels disposed in side-by-side relation and all extending in substantially the same direction, each side wall of each of the latter channels having a convexly curved upper end portion and a concavely curved lower end portion.

6. A solar heat collector as defined in claim 5 further including a series of substantially vertically spaced fins extending along the side walls of said downwardly opening channels.

7. A solar heat collector as defined in claim 2 further including an upwardly projecting male connector on one side edge of said panel, a downwardly opening female connector on the opposite side edge of said panel, said male connector being adapted to interfit with the female connector of an identical panel disposed adjacent said one side edge of said one panel, and said female connector being adapted to interfit with the male connector of another identical panel disposed adjacent said opposite side edge of said one panel.

* * * * *